(12) United States Patent
Knierim

(10) Patent No.: US 12,073,005 B2
(45) Date of Patent: Aug. 27, 2024

(54) EXPANDED INTEGRITY MONITORING OF A CONTAINER IMAGE

(71) Applicant: Siemens Aktiengesellschaft, Munich (DE)

(72) Inventor: Christian Knierim, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/017,243

(22) PCT Filed: Jul. 9, 2021

(86) PCT No.: PCT/EP2021/069208
§ 371 (c)(1),
(2) Date: Jan. 20, 2023

(87) PCT Pub. No.: WO2022/022995
PCT Pub. Date: Feb. 3, 2022

(65) Prior Publication Data
US 2023/0244817 A1    Aug. 3, 2023

(30) Foreign Application Priority Data

Jul. 27, 2020   (EP) ..................... 20187911

(51) Int. Cl.
*G06F 21/64* (2013.01)
(52) U.S. Cl.
CPC ................... *G06F 21/64* (2013.01)
(58) Field of Classification Search
CPC .... G06F 21/64; G06F 21/52; G06F 2221/033; G06F 21/51; G06F 21/6218
See application file for complete search history.

(56) References Cited

U.S. PATENT DOCUMENTS

| 10,154,065 B1 * | 12/2018 | Buchler | ............... G06F 21/6218 |
| 2003/0069696 A1 | 4/2003 | Curtis | |

(Continued)

FOREIGN PATENT DOCUMENTS

| CN | 110543537 A | 12/2019 |
| CN | 110673923 A | 1/2020 |
| EP | 3477524 A1 | 5/2019 |

OTHER PUBLICATIONS

Xu et al., "Cloud Data Security and Integrity Protection Model Based on Distributed Virtual Machine Agents", Oct. 2016, International Conference on Cyber-Enabled Distributed Computing and Knowledge Discovery, pp. 6-13 (Year: 2016).*

(Continued)

*Primary Examiner* — Kenneth W Chang
(74) *Attorney, Agent, or Firm* — Schmeiser, Olsen & Watts LLP

(57) ABSTRACT

A method for expanded integrity monitoring of a container image, wherein the container image contains at least two layers, a base image and at least one application layer, which carries out at least one modification operation on the base image, includes the following steps: during assembly of the container image, allocating an integrity rule specific to the layer to the layer, for at least one of the layers of the container image, providing the container image and the allocated integrity rules to a guest computer, and—generating a container instance on the basis of the container image via a real-time environment of the guest computer, checking each individual layer in relation to the allocated integrity rules during execution of the container instance in the real-time environment, and—executing the layer according to the allocated layer-specific integrity rule.

15 Claims, 2 Drawing Sheets

(56) References Cited

U.S. PATENT DOCUMENTS

| | | | |
|---|---|---|---|
| 2003/0078960 A1* | 4/2003 | Murren | H04L 69/18 |
| | | | 709/203 |
| 2011/0219146 A1* | 9/2011 | Jacobson | G06F 9/44505 |
| | | | 710/16 |
| 2012/0081395 A1* | 4/2012 | Adi | G06F 8/63 |
| | | | 345/634 |
| 2012/0216242 A1* | 8/2012 | Uner | G06F 21/51 |
| | | | 726/1 |
| 2017/0277524 A1* | 9/2017 | Bhat | G06F 8/60 |
| 2018/0314846 A1 | 11/2018 | Schultz et al. | |
| 2018/0349610 A1 | 12/2018 | Gupta et al. | |
| 2019/0180055 A1* | 6/2019 | Qiu | G06F 9/545 |
| 2020/0012818 A1* | 1/2020 | Levin | G06T 7/0002 |
| 2020/0097662 A1* | 3/2020 | Hufsmith | H04L 9/0643 |
| 2021/0329031 A1* | 10/2021 | Wira | G06F 9/45545 |
| 2023/0025529 A1* | 1/2023 | Fu | G06F 9/4406 |

OTHER PUBLICATIONS

PCT International Search Report and Written Opinion of International Searching Authority mailed Oct. 29, 2021 corresponding to PCT International Application No. PCT/EP2021/069208 filed Sep. 7, 2021.

* cited by examiner

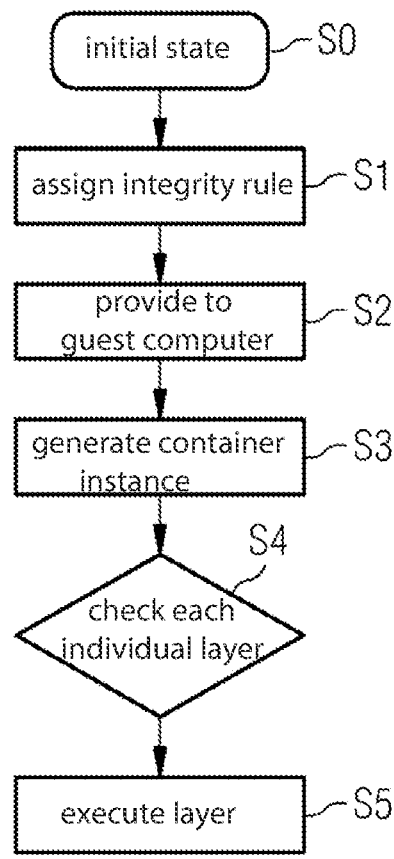
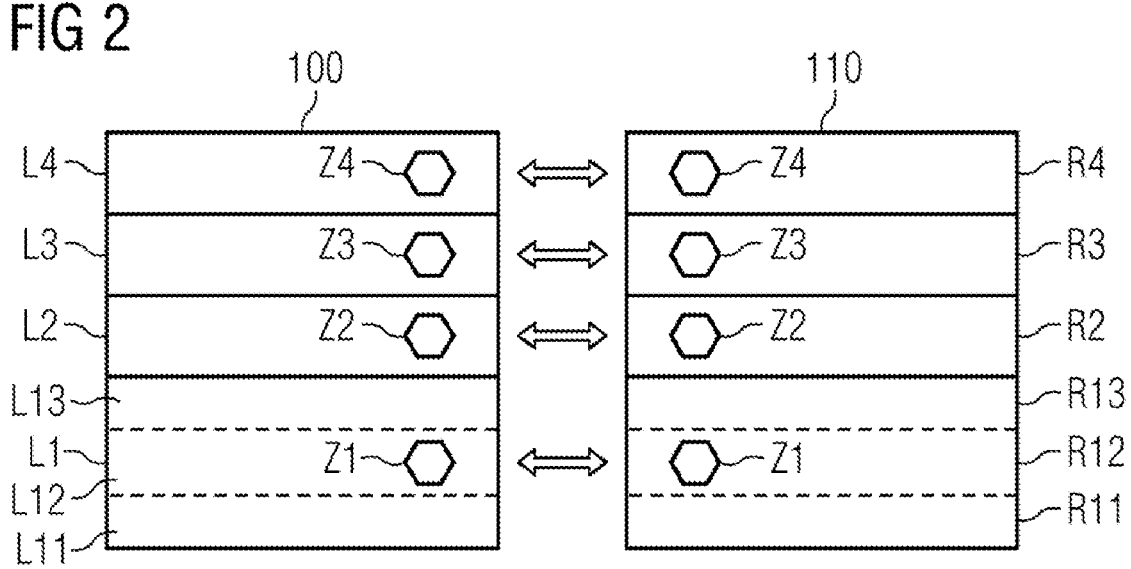

EXPANDED INTEGRITY MONITORING OF A CONTAINER IMAGE

CROSS-REFERENCE TO RELATED APPLICATIONS

This application claims priority to PCT Application No. PCT/EP2021/069208, having a filing date of Jul. 9, 2021, which claims priority to EP Application No. 20187911.1, having a filing date of Jul. 27, 2020, the entire contents both of which are hereby incorporated by reference.

FIELD OF TECHNOLOGY

The following relates to a method and a system for expanded integrity monitoring of a container image, in which the container image contains at least two layers, a base image and at least one application layer, which carries out at least one modification operation on the base image.

BACKGROUND

Computer-implemented services or applications can be provided by means of virtual containers on a special execution environment of a device. A device can be, for example, a server in a central server environment used jointly by multiple users, but can also be a decentralized peripheral device arranged at the periphery of a network, or a terminal device that is assigned to a single user. The server or device is provided with a container image from which one or more container instances that execute the functions of the application are generated at runtime of the service. The container image can be constructed, for example, in a format defined by the Open Container Initiative (OCI) comprising individual layers. A first layer usually contains resources such as libraries and programs, or else a package manager and is called a base image. The container image further comprises at least one application layer, which executes one or more modification operations on the base image and thereby provides the application.

Container integrity monitoring systems for monitoring the integrity of a computer-implemented application are known, with which guidelines for container instances can be created; if the guidelines are violated, an alarm is initiated, certain actions are blocked or the entire container instance is stopped for example. Multiple different permitted or forbidden actions can be defined in these guidelines. It is also possible to configure which programs are permitted or forbidden within the container instance.

US 2020/012818 A1 describes a method for maintaining the integrity of a container image constructed from layers. Integrity rules therein ensure the integrity of the container image because a loaded container image is assembled only from a trusted image, or image layers are provided only by trusted users.

US 2018/349610 A1 discloses a method in which a trustability and security of an application provided via a software container are checked during the startup of the application on a computer.

US 2018/314846 A1 discloses a method in which a security policy is assigned to each guest runtime environment. The guest runtime environment can be configured as a virtualization container which is executed as a process on the guest operating system. Objects can be specified as permitted or limited in the "namespace" of the container.

It is problematic in this regard that these guidelines are typically prepared by the operator of a production platform for the container image in a "trial and error" process. This requires an elaborate and complete testing of the application. The OCI format of container images, which is constructed in layers, is not supported in this case and therefore container instances which are not completely started until the final layer cannot be optimally protected.

SUMMARY

An aspect relates to design the provision of guidelines for the integrity monitoring to be more efficient and simpler and, in particular, to enable a complete integrity monitoring even for layer-based container images.

A first aspect of embodiments of the invention relates to a method for expanded integrity monitoring of a container image and of container instances generated therefrom, in which the container image contains at least two layers, a base image and at least one application layer, which carries out at least one modification operation on the base image, the method comprising the following steps:
- when assembling the container image, assigning for at least one of the layers of the container image an integrity rule specific for this layer,
- providing the container image and the assigned integrity rules to a guest computer, and during the runtime of the container instance on the guest computer,
- generating, based on the container image, the container instance by a runtime environment of the guest computer,
- checking each individual layer against the assigned integrity rule while executing the container instance on the runtime environment, and
- executing the layer depending on the assigned layer-specific integrity rule.

Thus integrity rules are defined and assigned to the respective layer already during creation of the container image. The integrity rule for a layer can contain a single rule or also multiple rules, which specify different aspects for the layer. Thus the integrity guidelines can be created already during their creation by a developer or integrator who knows the container-based application very precisely, and can be integrated in the assembly of the container image, referred to as a build process. Due to the layer-based definition of integrity rules, it is additionally possible to define integrity checks in such a way that they are adapted to the started layers of the respective instance. Therefore container instances in which not all layers are started can be completely checked in their execution.

In an advantageous embodiment, at least one base layer is assigned a base-layer-specific integrity rule, the base image containing at least one base layer.

Thus not only can the application layers and their modification operations be checked for integrity, but also the base image itself, which in turn can be constructed from multiple base layers, can be monitored with respect to integrity rules.

In an advantageous embodiment, for a base image having at least two base layers and at least two assigned base-layer-specific integrity rules, it is checked when assembling the container image whether the sequence of base-layer-specific integrity rules are mutually exclusive and, if this is the case, only the base-layer-specific integrity rule first or last in succession is marked and assigned to the base image as a whole.

Thus an integrity rule can be created and assigned to each individual base layer. The integrity rule for the base layer can thus be created quickly and in an uncomplicated, modular manner depending on the contained base layer. By checking the base-layer-specific integrity rules when assembling the container image, a conflict between the base-layer-specific integrity rules is recognized and a solution is found at an early point, and in particular prior to the creation of a container instance.

In an advantageous embodiment, a configuration setting for the assembly of the container image specifies whether the first or the last base-layer-specific integrity rule is assigned to the base image as a whole.

A configuration setting can thus be stored already during creation of the container image. This makes it possible to define integrity rules which generate an integrity violation in case of certain operations specified in subsequent layers. This defines which integrity rule is to be valid in the event of a conflict between integrity rules. Such an operation is, for example, an installation of a corresponding program or a starting of a process or an opening of a dedicated network port. Thereby a developer of the container image can check, for example, whether subsequent layers are specified according to a guideline prescribed by the manufacturer of the base image. Operations that are carried out under a specific user or take place on regions in the file system can thus lead to an integrity violation. The specific user can be a "root" for example. The base image is generally provided by a base image manufacturer to the producer of the container image, the manufacturer of the base image and the producer of the container image being different parties. In particular, the manufacturer of the base image is linked to the manufacturer of the runtime environment on which the container-based application is to be executed. For example, the runtime environment and the base image are distributed by the same manufacturer or the two are contractually linked.

In an advantageous embodiment, the layer-specific integrity rules are arranged in a stand-alone file during assembly of the container image.

A layer identifier ascertained for each layer during assembly is linked as an assignment identifier to the integrity rule stored for the respective layer. In particular, the layer identifier of the layer is assigned to the corresponding layer-specific integrity rule. Thus the layer-specific integrity rules can be stored and/or provided to the guest computer separately from the container image. This makes it possible, for example, to create two or more sets of layer-specific integrity rules for a container image and flexibly assign the entire set, which then exists as a file, to the container image.

In an advantageous alternative embodiment, the layer-specific integrity rules are arranged during assembly of the container image into meta-information for the layers of the container image.

This enables a tight coupling between layer and layer-specific integrity rule. This makes tampering with the layer-specific guideline more difficult. In particular, modifications to multiple layer-specific integrity rules thus become cumbersome and make deliberate tampering difficult.

In an advantageous embodiment, a type of further assembly of the container image can be configured if a compatibility between the layer and the layer-specific integrity rule of the previous layer is checked during assembly of the container image and an incompatibility is determined.

An incompatibility is determined if it is ascertained during the compatibility check that the layer is not compatible with the layer-specific integrity rule of the preceding layer. Thus it can be configured for example that in the event of a determined incompatibility, the assembly of the container image is terminated with an error message. Alternatively, for example the assembly can be continued without evaluating the integrity rule in the event that an incompatibility is determined. The types of further assembly are not limited to the two examples mentioned. The type of assembly can be configured in particular in the creation process of the container image. The configurability is particularly advantageous if it is enforced only on production environments, and no integrity violations are enforced on test environments, but only an alarm is to take place.

In an advantageous embodiment, the checking of each individual layer against the assigned layer-specific integrity rule is performed by means of an evaluation of event-based system calls by the container instance during the runtime.

With the checking of event-based system calls it is possible to check which activity or operations is/are performed by a container instance during the runtime and then compare this activity to the stored layer-based integrity rules.

In an advantageous embodiment, a hash value is determined at temporally cyclical intervals regarding the container instance created from the container image in order to check each individual layer against the assigned layer-specific integrity rule, and is provided as an integrity value to a reference database and compared to at least one specified integrity value in the reference database.

Hash values are formed here regarding the individual files and directories of the container image, in particular a container file system. For each modified or added file in a layer, it is necessary to define the layer to which this integrity value applies. In case of a high frequency of event-based system calls generated by the container instance, frequently not all system calls are promptly evaluated, or system calls are discarded in part. By virtue of the temporally cyclical ascertainment of integrity values, the checking of the integrity of the layers is independent of system calls so that the integrity monitoring is carried out even with a high frequency of event-based system calls.

In an advantageous embodiment, the specified integrity values and the reference database are created during assembly of the container image.

This has the advantage that even non-signed container images can be reliably checked for integrity by means of the integrity value. Since the specified integrity values are already created during the assembly of the container image, modifications of the container image between the assembly and the execution on the runtime environment can be determined during the checking.

Thus the integrity of the container image is ensured even between the assembly and the execution of the derived container instance, and tampering can be determined and responded to. This also yields an advantage for the integrity monitoring for signed container images, however. Checking the signature of the container image is only possible so long as the container image has not been executed, because the signature is calculated regarding the non-executed container image and modifications can be carried out over the runtime on the instance. Thus the integrity cannot be determined over the entire life cycle by using signatures. If the integrity rules are also defined in the build process, a continuous integrity monitoring, more particularly even during runtime of the container instance, is possible.

In an advantageous embodiment, the reference database is created at the start of the container image on the runtime environment of the guest computer.

This variant is used for signed container images. In that case the integrity of the container image itself can be checked by means of the signature of the container image. In this variant it is advantageously possible to take into account environment-specific parameters of the runtime environment such as variables for log files configurable at runtime.

In an advantageous embodiment, a base reference database for the base image is provided to the runtime environment of the guest computer prior to execution of the at least one application layer, and for each subsequent layer a difference value from the preceding layer is determined within the base reference database.

This enables a simplified creation of the layer-based integrity rules and in particular of the specified integrity values. Furthermore, simple integrity values can be adapted for different base images.

In an advantageous embodiment, a maximum number of system calls can be defined, beyond which there is a switch from a check by evaluating event-based system calls to a check by creating hash values.

Particularly with a large number of system calls, which are often linked to a faulty processing of the system calls or even the discarding of system calls, this makes it possible for the integrity monitoring to nevertheless be maintained in an optimized way.

A second aspect of embodiments of the invention relates to a system for expanded integrity monitoring of a container image having at least two layers and container instances derived therefrom, comprising an assembly device and a guest computer having a runtime environment, wherein the assembly device is designed to assign a layer-specific integrity rule to this layer during an assembly of the container image,
to provide the container image and the assigned integrity rules to the guest computer, and the guest computer is designed
to generate a container instance based on the container image by a runtime environment of the guest computer, during the runtime of the container instance on the guest computer,
to check each individual layer against the assigned integrity rule when executing the container instance on the runtime environment, and
to execute the layer depending on the assigned layer-specific integrity rule.

The system makes it possible to set up integrity rules already when creating or assembling the container image. Especially for container images that are created in a layer-based OCI format this makes it possible to set up integrity rules.

A third aspect of embodiments of the invention relates to a computer program product (non-transitory computer readable storage medium having instructions, which when executed by a processor, perform actions) comprising a nonvolatile computer-readable medium that can be loaded directly into a memory of a digital computer, comprising program code parts which are suitable for carrying out the steps of the method.

Unless otherwise indicated in the description below, the terms "provide", "generate", "check", "execute", and the like refer to actions and/or processes and/or processing steps that modify and/or generate data and/or transform the data into different types, where the data is represented or can occur in particular as physical variables such as electrical pulses. The system described and the devices or computers contained therein designate electronic devices having data processing properties and comprising at least one processor for data processing. The "devices" mentioned, for example the assembly device or the guest computer, can be implemented in hardware and/or in software. For a hardware implementation, the respective unit can be designed as a device or a part of a device, e.g. as a microprocessor. For a software implementation, the respective unit can be designed as a computer program product, as a function, as a routine or as a part of a program code or executable object.

A computer program product such as a computer programming means can be provided or supplied for example as a storage medium or else in the form of a downloadable file from a server in a network.

SUMMARY

Some of the embodiments will be described in detail, with reference to the following figures, wherein like designations denote like members, wherein:

FIG. 1 shows an exemplary embodiment of the method according to the invention as a flow chart;

FIG. 2 shows an example of an assignment between a layer-based container image and the assigned layer-specific integrity rules in a schematic representation;

DETAILED DESCRIPTION

Figure 3:
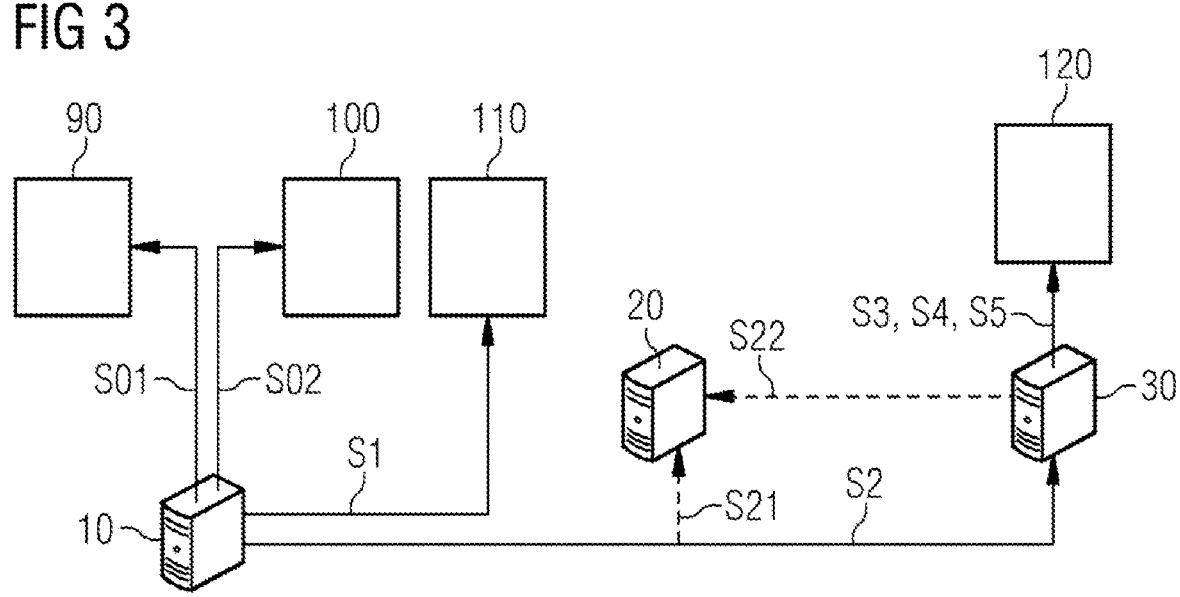
FIG. 3 shows a first exemplary embodiment of a system according to the invention and of the method steps carried out by the system components in a schematic representation.

Corresponding parts are provided with the same reference signs in all figures.

Applications provided by means of containers are typically created as a file system, for example by means of software products such as Docker. The following exemplary embodiment of the method according to embodiments of the invention refers occasionally to the provision of a container image by means of Docker as an example of a provision possibility, but is not limited thereto. Any other type of provision software for container virtualization can also be used.

A container image is specified in a file-based form and imaged on a layer-based container image file system corresponding, for example, to a standardized Open Container Intensive (OCI) format. A command line in such a file corresponds to one layer in a container image. The individual steps of the method originate from such a structure and generation of the container image and will now be explained further with reference to FIG. 1.

In an initial state S0, a container image comprising at least two layers that is generated in a creation process is present. The first, lowermost layer forms a base image. One or more layers thereabove, referred to as application layers, have at least one modification operation which is carried out on the base image.

In the first method step, at least one layer is assigned an integrity rule specific to the layer during an assembly of the container image. The assembling of the container image is frequently referred to as a "build process". Therein the container image is put together and coupled from multiple components, which are specified in a Docker file for example. One command line in a Docker file corresponds to one layer in the container image. A creator of the Docker file can insert these integrity rules as comments, for example, into the Docker file and thus configure it in a layer-based manner. Due to the layer-based definition of the integrity rules, it is possible to define the integrity checking and monitoring in such a way that they are adapted to the started layers of the respective container instance.

A first layer of the container image, the base image, in turn contains one or more base layers. One or more or all of these base layers can in turn each be assigned a base-layer-specific integrity rule. Since the manufacturer of the base image frequently does not coincide with the creator of the container image, the base-layer-specific integrity rules are generated by this manufacturer and provided pre-defined to the container image manufacturer. If the base image contains two or more base layers and at least two assigned base-layer-specific integrity rules, then there is a check during assembly of the container image of whether the sequence of base-layer-specific integrity rules mutually exclude one another.

If this is the case, then only the first or the last base-layer-specific integrity rule of the sequence is marked and assigned to the base image as a whole. This is necessary because the base layers are combined during assembly of the container image into a single first layer, the base image. Therefore the base-layer-specific integrity rules must also be combined when constructing the container image. The assignment of the first or the last integrity rule is stored via a configuration setting when creating the container image and is correspondingly executed when assembling. Thus only one integrity rule, too, is assigned to the base image as a whole. This makes it possible to define integrity rules which generate integrity violations by operations specified in subsequent layers.

This configuration setting makes it possible to produce an integrity rule compendium that can be inspected without contradictions. Thus an integrity violation can occur and be recognized if, for example, a specified program is installed or a non-permitted process is started or a non-permitted predetermined network port is opened by the subsequent layer of the container image. Thereby a developer of a container image can check, for example, whether subsequent layers are specified according to the guideline of the base image manufacturer. Operations that are carried out under a specific user, for example a privileged user furnished with extensive rights, for example those referred to as root rights, or operations that take place on regions in the file system, can thus lead to an integrity violation.

The same applies to the entire container image as well. An example:
A definition in the integrity guideline for the lowermost layer stipulates that the file/tmp must not be written to. A definition in layer 4 then states that writing to/tmp is nonetheless possible. It must then be settled which rule shall prevail in this case, i.e. whether the write authorization is integrity-conforming or not.

To be able to carry out integrity checks it is not sufficient to store them exclusively in the configuration file, i.e. the Docker file. The layer-specific integrity rules must be linked from the configuration file to the integrity rules when assembling the container image. The layer-specific integrity rules are arranged for this purpose in a stand-alone file for example.

FIG. 2 shows an integrity rule file 110 of this kind. The integrity rule file 110 contains the layer-specific integrity rules R1, R2, R3, R4. These rules are assigned for example via a respective assignment identifier Z1, Z2, Z3, Z4 to the corresponding layer in each case, i.e. the base layer L1 and, respectively, the application layers L2, L3, L4. The assignment identifier can be a layer identifier, for example, which is ascertained for each layer during assembly of the layers and uniquely identifies each of the layers.

As an alternative to the integrity rule file, the integrity rule specific to a layer can be directly inserted into meta-information, for example in the OCI file system, or into a new expansion of the existing meta-information formed for this purpose.

For the base image L1 of the container image 100, only a single assignment identifier Z1 is then used for assignment to the corresponding integrity rule R1 for the base image. The individual base layers L1.1, L1.2, L1.3 are combined during assembly of the container image into a single layer, from which the individual base layers can no longer be concretely ascertained.

During assembly of the container image there is a check as to whether integrity violations of the integrity rule occur which originate in the sequence of layers of the preceding layers. In the assembly process it is configurable in this case how. i.e. in what manner, the further assembly of the container image is continued if an incompatibility is determined. Such a configuration can be configured by the creator of the container image 100 during the specific assembly process, or can be fixedly specified by a permanent setting in the assembly process. The type of further assembly can then be that the assembling terminates with an error, or is finished without an evaluation of the integrity rules for example.

Insofar as the container image 100 is created within a continuous implementation and integration process (CI/CD pipeline), it is then likewise configurable whether the continuous implementation and integration process is stopped with an error in the event of an integrity violation or the container image creation is finished. In a test environment, the type of further assembly can thereby be configured in such a manner, for example, that no integrity violations are enforced but rather only an alarm is issued. On a production environment, on the other hand, the type of further assembly of the container image can be configured such that the further assembly of the container image 100 is terminated in the event of an integrity violation.

If the container image 100 and the layer-specific integrity rules have been assigned, then the container image 100 and the assigned integrity rules 110, for example the integrity rule file or the container image 100 with the meta-information that has been expanded with the integrity rules 110, are provided to a guest computer in method step S2. In the guest computer, a container instance based on the container image 100 is generated by a runtime environment; see method step S3. On the runtime environment, each individual layer L1, L2, L3, L4 is checked against the assigned integrity rule R1, R2, R3, R4 during execution of the container instance; see method step S4. Depending on the assigned layer-specific integrity rule R1, R2, R3, R4 and the specifications and measures defined therein, the respective layer L1, L2, L3, L4 is executed; see method step S5.

An integrity check can optionally be carried out already at the start of the container instance on the runtime environment. Not every layer of the container image is necessarily assigned an integrity rule. For the container image 100 from FIG. 2, for example, a layer-specific integrity rule R1, R3, R4 could exist and be assigned only for the first, second and fourth layers L1, L2, L4. Layer L3 is accordingly executed without an integrity check. It is also not necessary for an integrity rule R1 to be assigned to the base image L1.

The checking of each individual layer against the assigned integrity rule is carried out, for example, by means of an evaluation of event-based system calls that are generated by the container instance during the runtime against the integrity rules. The checking can be performed with the aid of special filter programs. If only signed container images are permitted on the runtime environment, then by evaluating system calls during the entire runtime of the container instance, the integrity thereof can be ensured. Checking the signature of signed container images can ensure that the container image as such has not been changed. The checking of system calls makes it possible to check at runtime which activity a container instance is executing and to compare this activity to the stored integrity rules.

If a fast sequence of system calls has been generated by the container instance, it is not always ensured that all system calls have actually been evaluated and that the evaluation is timely. As an alternative thereto, the integrity check can therefore be performed cyclically by using hash values which are generated regarding the individual files and directories of the container instance. These hash values are stored in a reference database and compared there to specified integrity values. The checking thus takes place at temporally recurring and predefined regular or variable time intervals. The checking can also be triggered by an event or carried out at temporally varying intervals. The ascertained hash value is compared to at least one specified integrity value in the reference database.

A maximum number of system calls can be defined, beyond which there is a switch from checking by means of evaluating event-based system calls to checking by means of creating integrity values. A time interval for the cyclical checking can be configured in this case. For example, a time interval of 60 seconds can be set.

The use of the reference database additionally has the advantage that it is not mandatory to execute container instances of signed container images on the runtime environment. In this case, a first specified hash value, and thus an integrity value, is generated and stored in the reference database already during assembly of the container image. For each modified or added file, it is necessary to define the layer to which the integrity value applies.

Alternatively, the reference database can be generated only at startup of the container instance on the guest computer on which the runtime environment is operated. To ensure the integrity of the container instance, it is necessary to use only signed container images on the runtime environment. With the reference database generated only at the startup of the container instance, environment-specific parameters of the runtime environment, such as configurable log files, can be taken into account. It is likewise possible for both variants that a separate integrity database is provided for the base image, for example by the manufacturer of the base image, and for further added layers merely a reference value between the integrity value of the added layer and the base image is calculated and stored.

FIG. 3 shows a system for expanded integrity monitoring of container images and/or the container instances generated therefrom and the method steps carried out by the individual components of the system.

The system comprises an assembly device 10, for example an assembly server, a register device 20 and a guest computer 30. In the assembly device 10, a configuration file 90, for example a Docker file, which contains the individual components for the layers of the container image 100, is translated and a container image 100 is assembled therefrom; see S02. During assembly of the container image, the layer-specific integrity rules are also assigned in the assembly device 10 to the corresponding layers. This corresponds to method step S1. The assembly device 10 also carries out the second method step S2 and provides the container image 100 and the assigned integrity rules 110 to the guest computer 30.

The assembly device 10 transmits the container image 100 with the integrity rules 110 as meta-information, or the container image 100 and the integrity rules 110 in two different files, to the register device 20; see S21. The guest computer 30 calls the container image 100 and the integrity rules 110 from the register device 20; see S22. The guest computer 30 starts the container image 100 and generates a container instance therefrom. During the subsequent runtime of the container instance, the individual layers of the container instance are checked against the assigned integrity rules—see S3—and the layers are executed depending on the assigned, layer-specific integrity rule; see S4 and S5. The different phases from the creation of a configuration file to the assembly of the container image and the assignment of the integrity rules up to the transmission of the container image can be performed via a continuous provision and continuous integration platform, also known as a CI/DI platform.

Figure 4:
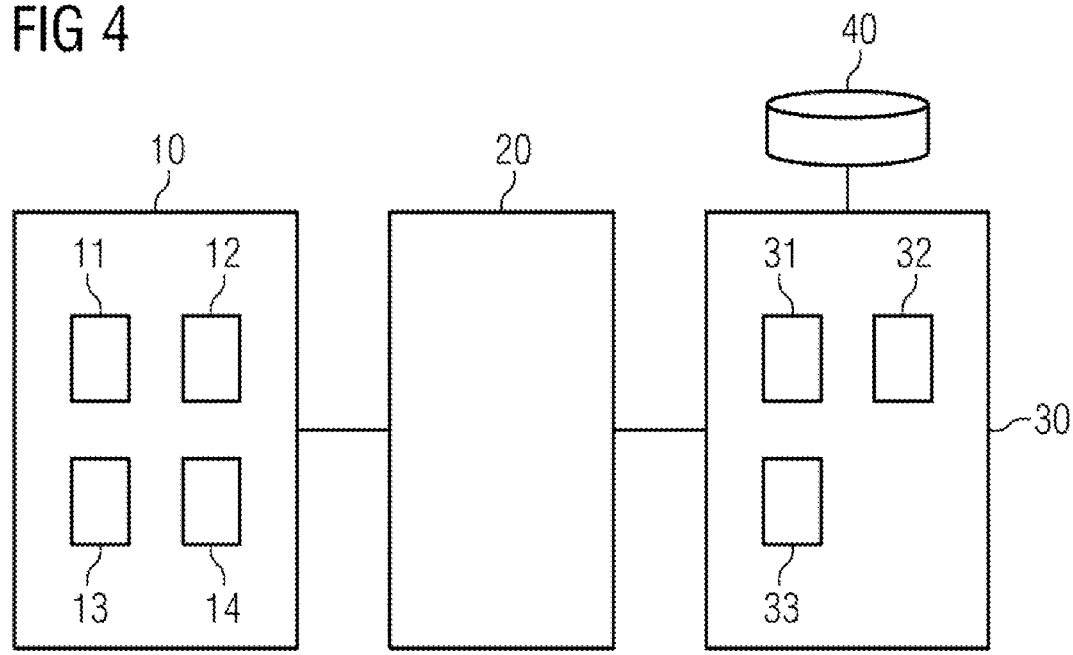
FIG. 4 shows a second exemplary embodiment of the system according to the invention in a block diagram.

FIG. 4 shows the individual components of the system in detail. The assembly device 10 therein is connected via a data communication link to the register device 20 and the register device 20 is in turn connected via a data communication link to the guest computer 30. The assembly device 10 comprises a translation unit 11, an assignment unit 12, a construction unit 13 and a provision unit 14. The translation unit 11 receives and processes the configuration file. The assignment unit 12 creates integrity rules for each layer and assigns the integrity rule created specifically for a layer to the corresponding layer. The integrity rule can alternatively also be created outside the assembly device 10 and specified integrity rules can be received by the assignment unit 12 and further processed. In the assignment unit 12, for example, integrity values can also be generated for the individual layers and provided via a provision unit 14 to a reference database 40.

The assembly device 10 further comprises a build unit 13, which assembles the container image, and the provision unit 14, an input and output interface for example, which is configured so as to provide the container image and the integrity rules via the register device 20 to the guest computer 30 for example.

The guest computer 30 comprises a generating unit 31, which generates the container instance from the received container image. The guest computer 30 further comprises a checking unit 32, which is designed to check each individual layer against the assigned integrity rule during execution of the container instance on the runtime environment. The checking unit 32 reports the checking result and/or the measures resulting from the check to an execution unit 33, which executes the measures depending on the assigned layer-specific integrity rule or the checking result.

The generating unit 31, the checking unit 32 and the execution unit 33 can be formed integrated into one unit. However, the generating unit, the checking unit and the execution unit 31, 32, 33 can also be present as separate stand-alone components and contain one or more processors on which the method steps within an integrity monitoring program are executed.

In summary, it is possible with the described method and the integrity monitoring system to store integrity rules already when creating the container image within the generation process, in particular within a continuous provision and integration process. Layer-based integrity rules make it possible to protect container instances flexibly, which were started and run merely from a part of the layers contained in the container image. It is additionally possible to configure whether integrity checks at runtime are conducted via the evaluation of system calls or cyclically via the reference database. By providing a reference database for base images, it is possible to detect only the deviations of the layers from the base image in the database when starting the container instance or when constructing the actual container image. Actions that cause an integrity violation can either be only reported or completely blocked. It can be checked whether added layers are in conformity with the guidelines in the preceding configured layer.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for expanded integrity monitoring of a container image and of container instances generated therefrom, in which the container image contains at least two layers, a base image and at least one application layer, which carries out at least one modification operation on the base image, the method comprising:
   when assembling the container image, assigning for at least one of the layers of the container image an integrity rule specific to the layer and checking whether integrity violations of the integrity rule occur which originate in a sequence of layers of the preceding layers;
   providing the container image and the assigned integrity rule to a guest computer;
   generating, based on the container image, a container instance by a runtime environment of the guest computer;
   during a runtime of the container instance on the guest computer, checking each individual layer against the assigned integrity rule while executing the container instance on the runtime environment, and
   executing the layer depending on the assigned layer-specific integrity rule.

2. The method according to claim 1, wherein the base image contains at least one base layer, and a base-layer-specific integrity rule is assigned to the at least one base layer.

3. The method according to claim 2, wherein for a base image having at least two base layers and at least two assigned base-layer-specific integrity rules, it is checked when assembling the container image whether the base-layer-specific integrity rules are mutually exclusive and, if this is the case, only the base-layer-specific integrity rule that is the first or the last in a sequence is marked and assigned to the base image as a whole.

4. The method according to claim 3, wherein a configuration setting for the assembly of the container image specifies whether the first or the last base-layer-specific integrity rule is assigned to the base image as a whole.

5. The method according to claim 1, wherein the layer-specific integrity rules are arranged with a respective assignment identifier for the assigned layer in a stand-alone file during assembly of the container image.

6. The method according to claim 1, wherein the layer-specific integrity rules are arranged in meta-information for the layers of the container image during assembly of the container image.

7. The method according to claim 1, wherein a compatibility between the layer and the layer-specific integrity rule of the previous layer is checked during assembly of the container image, and wherein a type of further assembly of the container image can be configured if an incompatibility is determined.

8. The method according to claim 1, wherein the checking of each individual layer against the assigned layer-specific integrity rule is performed by means of an evaluation of event-based system calls of the container instance during the runtime.

9. The method according to claim 1, wherein for checking each individual layer against the assigned layer-specific integrity rule, a hash value is determined at temporally cyclical intervals regarding the container instance created from the container image and is provided as an integrity value to a reference database and compared to at least one specified integrity value in the reference database.

10. The method according to claim 8, wherein the specified integrity values and the reference database are created during assembly of the container image.

11. The method according to claim 9, wherein the reference database is created at the startup of the container image on the runtime environment of the guest computer.

12. The method according to claim 8, wherein a base reference database for the base image is provided to the runtime environment of the guest computer prior to execution of the at least one application layer, and for each subsequent layer a difference value from the preceding layer is determined within the base reference database.

13. The method according to claim 8, wherein a maximum number of system calls can be defined, beyond which there is a switch from a check by means of evaluating event-based system calls to another check by means of creating hash values.

14. A system for expanded integrity monitoring of a container image having at least two layers and container instances derived therefrom, comprising:
   a server and a guest computer having a runtime environment, wherein the server is configured to:
      assign, when assembling the container image, for at least one of the layers of the container image an integrity rule specific for the layer;
      checking, when assembling the container image, whether integrity violations of the integrity rule occur which originate in a sequence of layers of the preceding layers;
      provide the container image and the assigned integrity rule to the guest computer; and
   wherein the guest computer is configured to:
      generate, based on the container image, a container instance by the runtime environment of the guest computer,
      during the runtime of the container instance on the guest computer, check each individual layer against the assigned integrity rule while executing the container instance on the runtime environment, and
      execute the layer depending on the assigned layer-specific integrity rule.

15. A computer program product, comprising a computer readable hardware storage device having computer readable program code stored therein, said program code executable by a processor of a computer system to implement a method according to claim 1.

\* \* \* \* \*